US011818556B2

(12) United States Patent
Sha et al.

(10) Patent No.: US 11,818,556 B2
(45) Date of Patent: Nov. 14, 2023

(54) USER SATISFACTION BASED MICROPHONE ARRAY

(71) Applicant: EMC IP Holding Company LLC, Hopkinton, MA (US)

(72) Inventors: Danqing Sha, Shanghai (CN); Amy N. Seibel, Newton, MA (US); Eric Bruno, Shirley, NY (US); Zhen Jia, Pudong (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/451,758

(22) Filed: Oct. 21, 2021

(65) Prior Publication Data

US 2023/0129322 A1    Apr. 27, 2023

(51) Int. Cl.
| | |
|---|---|
| *H04R 3/00* | (2006.01) |
| *G06F 3/16* | (2006.01) |
| *H04R 1/40* | (2006.01) |
| *G06N 20/00* | (2019.01) |
| *G10L 21/0232* | (2013.01) |
| *G10L 21/0216* | (2013.01) |

(52) U.S. Cl.
CPC ............ *H04R 3/005* (2013.01); *G06F 3/165* (2013.01); *H04R 1/406* (2013.01); *G06N 20/00* (2019.01); *G10L 21/0232* (2013.01); *G10L 2021/02166* (2013.01); *H04R 2201/401* (2013.01)

(58) Field of Classification Search
CPC .. H04R 3/005; H04R 1/406; H04R 2201/401; G06F 3/165; G06N 20/00; G10L 21/0232; G10L 2021/02166

USPC ............................................... 381/56, 58, 92
See application file for complete search history.

(56) References Cited

U.S. PATENT DOCUMENTS

| | | | |
|---|---|---|---|
| 9,986,360 B1* | 5/2018 | Aas .................. | H04M 3/569 |
| 10,922,484 B1* | 2/2021 | Pereira ................. | G06F 40/279 |
| 10,986,437 B1 | 4/2021 | Pan et al. | |
| 11,245,993 B2 | 2/2022 | Andersen et al. | |
| 11,404,073 B1 | 8/2022 | Zhang | |
| 11,523,244 B1 | 12/2022 | Meade et al. | |
| 2019/0008074 A1* | 1/2019 | Chen ................. | G05D 23/1917 |
| 2019/0028803 A1 | 1/2019 | Benattar | |
| 2019/0304431 A1* | 10/2019 | Cardinaux ....... | G10K 11/17813 |
| 2019/0326989 A1* | 10/2019 | McElveen ............. | H04R 3/005 |
| 2020/0145753 A1 | 5/2020 | Rollow, IV | |
| 2021/0118462 A1 | 4/2021 | Tommy et al. | |
| 2021/0136127 A1* | 5/2021 | Ghanaie-Sichanie ....................... | H04L 65/1069 |
| 2022/0060812 A1 | 2/2022 | Ganeshkumar | |
| 2022/0060822 A1* | 2/2022 | Chng .................... | H04R 1/083 |
| 2022/0114995 A1 | 4/2022 | Kuthuru et al. | |

(Continued)

FOREIGN PATENT DOCUMENTS

EP          3809410 A1    4/2021

*Primary Examiner* — William A Jerez Lora
(74) *Attorney, Agent, or Firm* — Workman Nydegger (57) ABSTRACT

One example method includes performing sound quality operations. Microphone arrays are used to cancel or reduce or suppress background noise and to enhance speech. Subjective user input is received by an orchestration engine. The orchestration engine generates an output that includes at least adjustments to a microphone array. Controlling the microphone array based, in part, on subjective user feedback, allows desired speech or desired sound to be heard more clearly by the user.

20 Claims, 9 Drawing Sheets

(56) References Cited

U.S. PATENT DOCUMENTS

2022/0142600 A1* 5/2022 Tefft ................... H04R 29/008
2022/0236946 A1* 7/2022 Khosrowpour ......... G06F 3/165

* cited by examiner

USER SATISFACTION BASED MICROPHONE ARRAY

FIELD OF THE INVENTION

Embodiments of the present invention generally relate to user satisfaction and sound management operations. More particularly, at least some embodiments of the invention relate to systems, hardware, software, computer-readable media, and methods for sound quality operations including user feedback related operations to improve sound quality.

BACKGROUND

One of the ways that people in different locations communicate is conference calls. Conference calls today, however, are distinct from conference calls of the past. Conference calls, as used herein, can include any number of participants. Further conference calls may be performed using audio only, video and audio, or the like. Many of the applications for conference calls include additional features such as whiteboards, chat features, and the like. These types of calls (also referred to as online meetings, video conferences, webinars, zoom meeting) have many forms with varying characteristics.

However, noise is often a problem and impacts at least the audible aspect of conference calls. Noise, as used herein and by way of example only, generally refers to unwanted signals (e.g., background noise) that interfere with a desired signal (e.g., speech). For instance, a radio playing in the background of a first user's environment may interfere with the ability of that first user to hear incoming audio. The same radio may be inadvertently transmitted along with the first user's voice and impact the ability of a remote user to clearly hear the first user. In both cases, noise that is local to a user and noise that is remote with respect to the same user can impact the audio quality of the call and impact the ability of all users to fully participate in the call.

Today, there are many opportunities to use these types of calls. Many people are working remotely. Students are also learning remotely. This increased usage has created a need to ensure that workers, students, and others have good sound quality.

However, current methods for reducing noise are often unsatisfactory. For example, conventional digital signal processing (DSP) algorithms may be able to classify a signal as speech, music, noise, or other sound and may be able to suppress the unwanted signal. Even assuming that DSP algorithms are useful for stationary noises, these algorithms do not function as well with non-stationary noises. As a result, these algorithms to not scale or adapt to the variety and variability of noises that exist in an everyday environment.

Beamforming is a technique that allows a speaker's speech to be isolated. However, this technique degrades in situations where there are multiple voices in the same room. Further, beamforming techniques do not suppress reverberation or other noise coming from the same direction. In fact, beamforming does not necessarily mask larger noises in the environment.

Some solutions, such as headphones, may provide some improvement. However, headphones are often uncomfortable, particularly when worn for longer periods of time, and impede the user in other ways. There is therefore a need to improve sound quality and/or user comfort in these types of calls and environments. There is also a need to improve the sound quality and/or user comfort during a call.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to sound quality and sound quality operations including adaptive noise suppression or noise reduction. Embodiments of the invention further relate to improving sound quality operations by incorporating user suggestions or user satisfaction inputs as feedback to optimize sound quality. Embodiments of the invention allow user input or user satisfaction input and machine learning models to optimize sound quality by controlling microphone arrays and other aspects or components involved in sound quality operations.

Microphone arrays can be used to separate and localize sound sources. This information can be used to generate a cancellation signal to cancel the unwanted signals. Further, this information can also be used to optimize the microphone array configuration.

Embodiments of the invention may refer to the microphone arrays as performing some function, algorithm, or action (e.g., noise cancellation). It is understood, however, that these functions, algorithms, or actions may be performed by processing the sounds sensed by the arrays using computing resources that may or may not be integrated with the microphone array. Further, the processing may be performed at the array, at a local device, in the cloud, or the like or combination thereof. In addition, noise cancellation is typically achieved by emitting a cancelling signal, which is generated in a manner that is based on the sound sensed by the microphone array. More particularly, at least some embodiments of the invention relate to systems, hardware, software, computer-readable media, and methods for improving sound quality by actively reducing noise in an environment using user feedback including subjective user feedback. Embodiments of the invention further relate to improving sound quality for a user with respect to noise from the user's environment and noise from the environment of other remote users communicating with the user. Thus, embodiments of the invention both improve the sound quality of audio received from remote users while also improving the sound quality by suppressing or reducing the impact of noise in the user's environment. This is achieved in part, by optimizing the sound quality based on user satisfaction inputs.

Generally, users participating in a conference call or in other situations in which sound quality is relevant to a user can provide satisfaction-based inputs. A user may be able to provide feedback such as "too noisy", "too much echo", or the like using a user interface. The feedback is used to optimize operation of the sound quality system, which may include controlling aspects of microphone arrays that capture the sound delivered to users participating in conference calls and/or generating and output a signal (e.g., via the user's speakers) to cancel the noise or echo.

More specifically, an orchestration engine, which may be implemented as a machine learning model, may generate optimal current and future settings for each microphone array for the user or users based, at least in part, on the user feedback inputs. For example, the microphone array of a laptop or other device and the orchestration engine may implement noise suppression and/or speech enhancement to reduce or cancel background noise and to increase speech intelligibility.

As users provide subjective feedback during a call and/or after a call, the settings at the time of the feedback and the types of input (the sounds received from the user's environment) at the time the feedback was given can be logged and stored locally and/or transmitted to an edge or cloud or datacenter server. This logged information can be used to update a machine learning model or to generate an insight (e.g., new settings). Alternatively, the changes to the machine learning model (the learning based on the logs) can be transmitted. This allows the orchestration engine to continually improve and make improvements to the audio or sound quality based on user satisfaction input.

In one example, the training process may include an initialization period where a user listens to some simulated audio environments and is presented with several possible improvement settings. The user provides feedback that works best for the user in that scenario. A user may also input their desired preferences, which may include prioritizing the need to reduce or suppress a specific type of noise that is commonly heard in the user's environment and/or altering or enhancing desired sounds or signals. After training the model, the user may continue to provide inputs on a regular basis at specified times, and/or when experiencing unsatisfactory sound quality. In some examples, the user may be prompted to provide feedback if a deterioration in audio quality is detected.

Embodiment of the invention may also perform sound quality operations in different situations. Embodiments of the invention can be implemented when a single user is in an environment and when multiple users are in the same environment. For example, background noise that occurs in an environment where multiple users (and their devices and microphone arrays) are present can include typical background noise and the speech of other users. In an environment that includes multiple users, the sound quality for each user can be controlled separately. Thus, the noise suppression performed in an area near a first user may differ from noise suppression performed in another area of the same environment. In other words, the cancellation signal emitted by the device to one user to cancel noise for that user may be different from the cancellation signal emitted by the device to another user in the environment. Thus, the sound quality operations can be focused on individual users, even when in the same environment.

FIGS. 1A-5 discuss aspects of sound quality operations that to suppress noise and/or enhance speech or, more generally, to suppress unwanted signals and enhance desired signals. FIGS. 6A-8 disclose aspects of user satisfaction input and aspects of incorporating user satisfaction into the sound quality operations being performed.

Figure 1A:
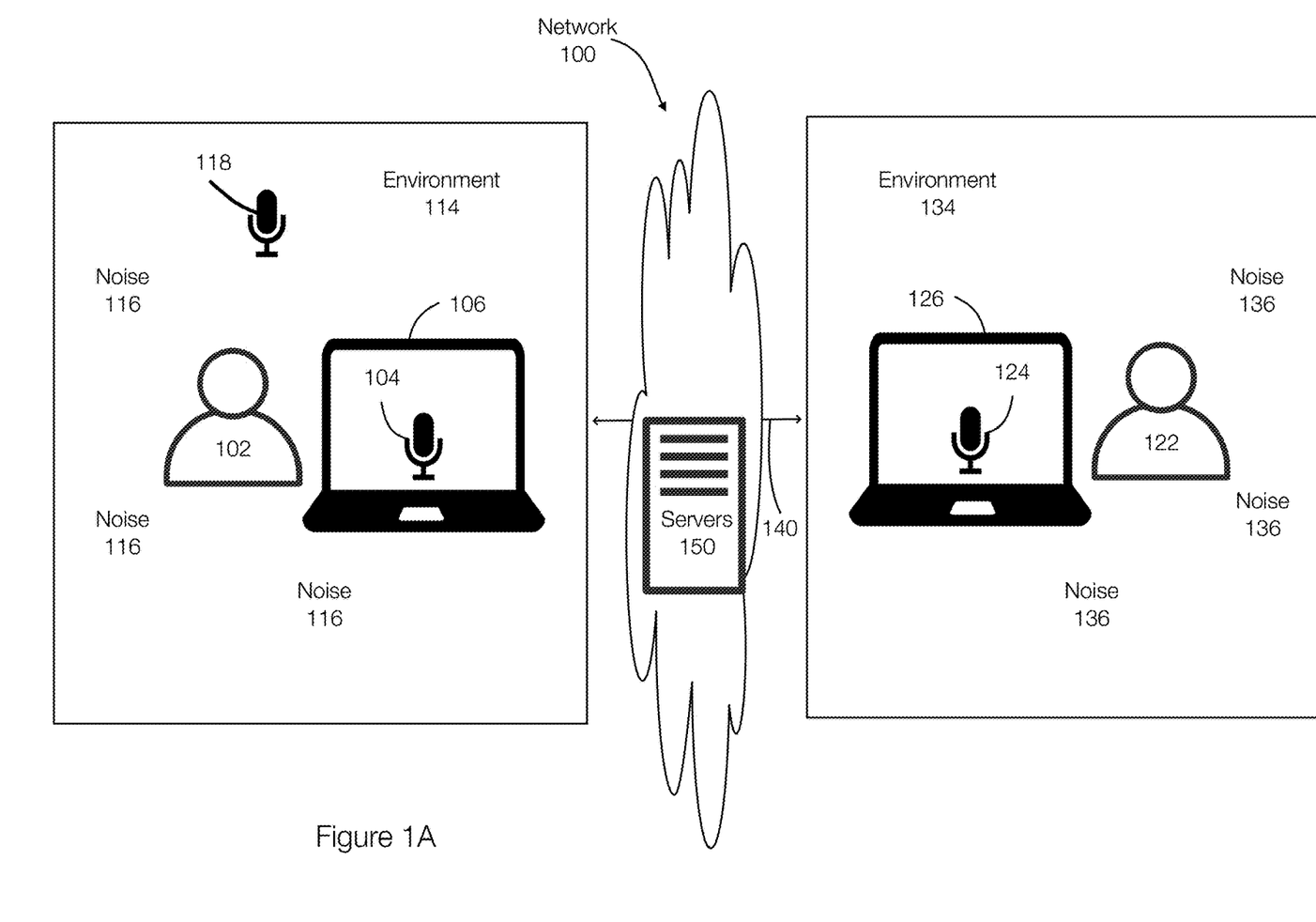
FIG. 1A discloses aspects of a microphone array deployed in an environment and configured to suppress unwanted noise signals.

FIG. 1A illustrates an example of an environment in which sound quality operations are performed. FIG. 1A illustrates a user 102 and a user 122 that are participating in a call 140 over a network 100. The call 140 includes at least an audio component and may also include other components such as a video component, a text component, a whiteboard component, or the like or combination thereof. The audio component may be transmitted over a network 100 using any suitable protocol.

The user 102 is present in an environment 114 that includes noise 116. The noise 116 may emanate from multiple sources including stationary sources or non-stationary sources. The noise may include general background noise and may also include speech of other persons. Background noise may include, but is not limited to, other voices, external noise (e.g., street noise), music, radio, television, appliances, or other noise that may be generated in a user's environment and the adjacent proximity. In other words, background noise may include any signal that can reach the user. Similarly, the user 122 is in an environment 134 that includes similar noise 136.

In this example, the user 102 may be communicating in the call 140 using a device 106 and the user 122 may be communicating in the call 140 using a device 126. The devices 106 and 126 may be smart phones, tablets, laptop computers, desktop computers, or other devices capable of participating in calls over a network 100.

In this example, a microphone array 104 may be present on or integrated into the device 106 or deployed in the environment 114. Similarly, a microphone array 124 may be present on or integrated into the device 126 or deployed in the environment 134. The arrays 104 and 124 may also be peripheral devices.

The arrays 104 and/or 124 may include any desired number of microphones that may be arranged in symmetric and/or asymmetric configurations. Different portions of the arrays 104 and 124 may have different microphone arrangements. In one embodiment, the environment 114 may include additional arrays (represented by the array 118) that may be separate and/or independent of the array 104. These arrays 118 may also be connected to the device 106 in a wired or wireless manner. The array 104 and any additional arrays 118 may be used collectively and collaboratively to perform the sound quality operations discussed herein. Other environments may be similarly provisioned.

The arrays 104, and 124 are configured to suppress local and/or remote noise such that the signals provided to the users 102 and 122 include a high-quality speech or audio signal. These arrays 104, and 124 are configured to reduce the level of localized and ambient noise signals including random noises, interfering or additional voices, environment reverberation, and the like. Further, the arrays 104, and 124 are associated with machine learning models and are able to adapt and learn to better reduce noise in an environment. Embodiments of the invention, described with respect to the users 102 and 122, may be applied to calls that include multiple users.

The array 104 is placed in the environment 114 around the user 102 and is often positioned in a manner that may depend on how the user 102 uses the device 106.

The array 104 may be associated with or include a controller and or processing engine (e.g., see FIGS. 3 and 4) and with engine configured to process the sound detected by the microphones in the array 104.

The array 104 (or more specifically the controller or processing engine) may perform sound source localization, sound source extraction and noise suppression. The array 104 may include or be associated with machine learning models or artificial intelligence configured to source noise, identify noise and generate anti-noise in real time. Thus, the noise 116 generated or sourced in the environment 114 is reduced or cancelled using signals from the array 104.

In one example, when the array 104 is configured to suppress the noise 116, the array 104 may be configured with speakers that generate an anti-noise signal independent of any audio generated by the device 106 speakers.

In another example, the array 104 receives or detects noise and generates a signal or provides an output corresponding to or describing the noise. This signal is processed (e.g., at the device 106 or other location such as an edge server) and an output is generated at speakers of the device 106 (or other speakers) to cancel the noise 116.

The array 104 may be configured to improve the speech of the user 102 transmitted to the user 122. Thus, the array 104 may perform dereverberation, echo cancellation, speech enhancement, and beamforming to improve the audio or speech of the user 102 transmitted over the network 100. The array 124 operates in a similar manner to the array 104. Stated differently, the sound sensed by the arrays can be used to remove noise, echo, reverberation, or the like from any speech signal transmitted over the network 100.

In one example, the audio heard by the user 102 and output by the device 106 (or other speakers in the environment 114) is a mix of audio from the user 122, which was improved at least by the arrays 124 and a signal generated to cancel or reduce/suppress the noise 116 based on input from the array 104.

In one example, the array 104 operates or is used to cancel or reduce/suppress the noise 116 in the environment 114. This allows the user 102 to better understand audio output from the device 106 that originated with the user 122, which audio was improved by at least the array 124.

Because the arrays 104, and 124 are associated with artificial intelligence or machine learning models, the arrays can be improved using both objective and subjective feedback. These feedback can be provided regularly or even continually in some instances.

Figure 1B:
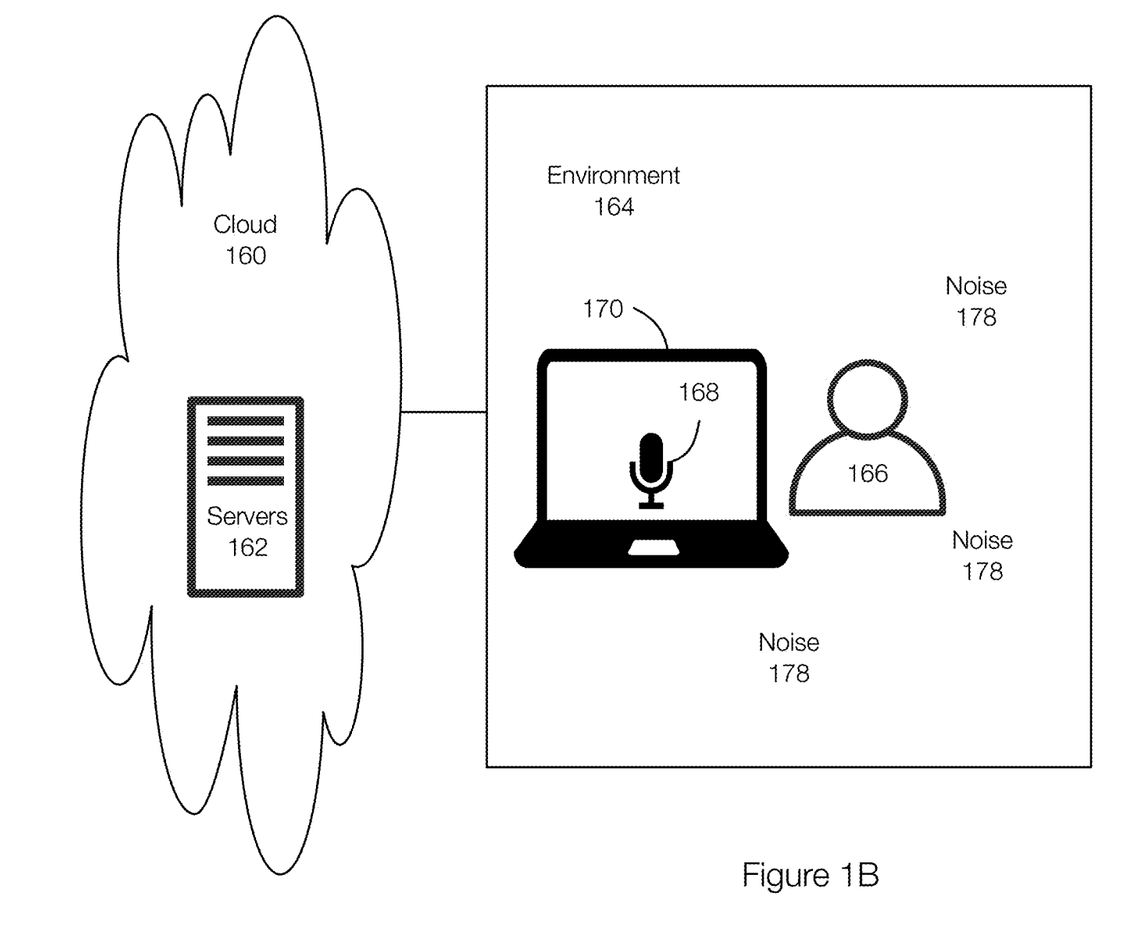
FIG. 1B discloses another example of a microphone array deployed in an environment and configured to suppress unwanted noise signals.

FIG. 1B illustrates an example of an environment in which sound quality operations may be performed. While FIG. 1A related, by way of example only, to conference calls, FIG. 1B illustrates that sound quality operations may be performed in a user's own environment.

In FIG. 1B, a user 166 may be associated with a device 170 that may include a microphone array 168. The array 168 is similar to the arrays discussed with respect to FIG. 1A.

In this example, the array 168 may be configured to perform sound quality operations in the environment 164. Although the device 170 may be connected to the cloud 160 and may be accessing servers 162 (or other content), this is not required to perform sound quality operations in the environment 164. Further, the servers 162 (or server) may be implemented as an edge server, on the device 170, or the like. In fact, in one embodiment, the sound quality operations may be performed only with respect to the environment 164 (e.g., the device 170 need not be connected to the cloud 160 or other network).

The array 168 may be configured to cancel or suppress the noise 178 such that any audio played by the device 170 (or attached speakers) is more clearly heard by the user 166. Thus, the array 168 may generate an anti-noise signal that can be combined with any desired audio received and/or emitted by the device 170 such that the desired audio is clearly heard and the noise 178 is cancelled or suppressed. As discussed below, sound quality operations in the environment 164 are included in the following discussion.

Figure 2:
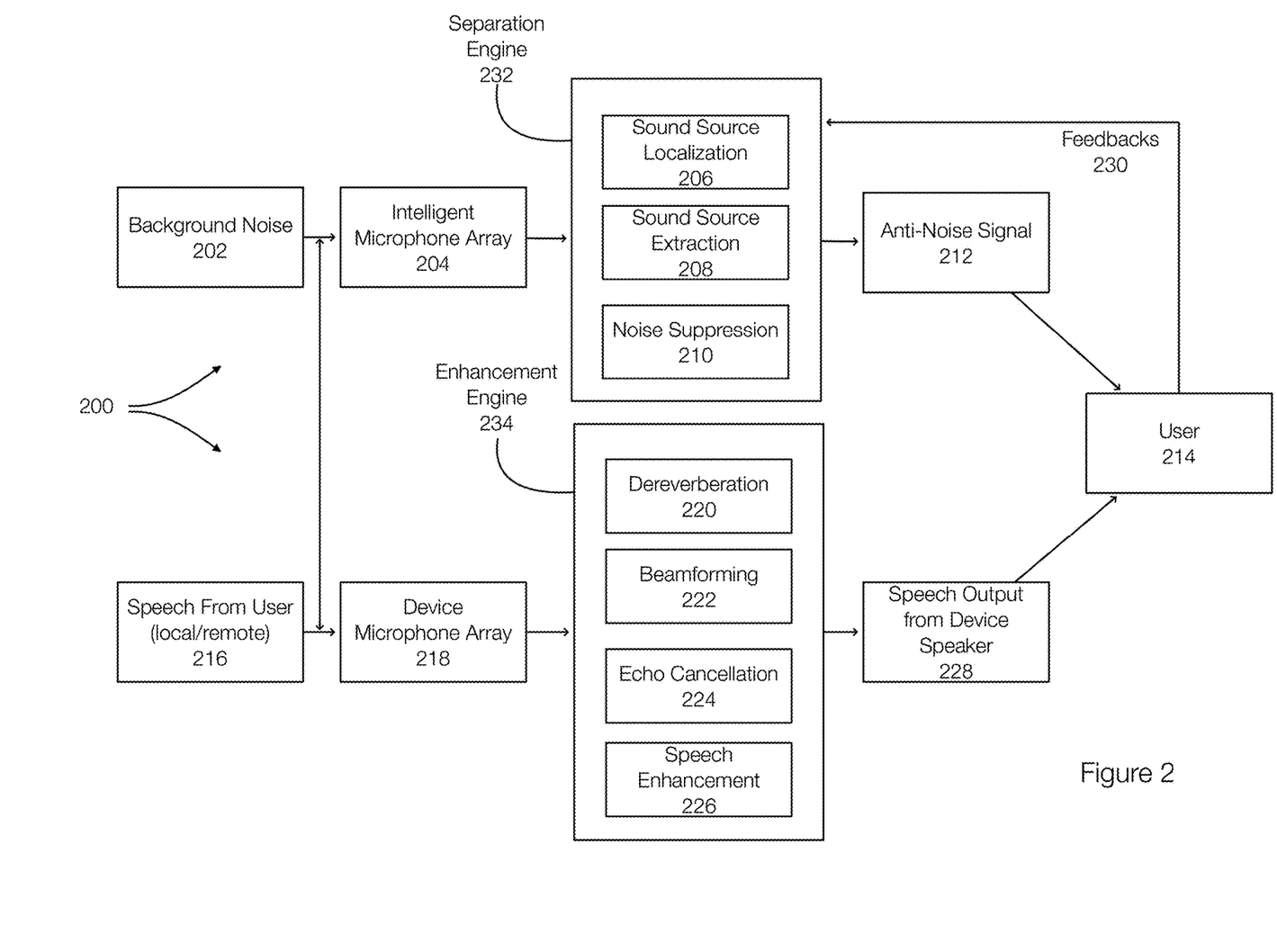
FIG. 2 discloses aspects of an architecture including microphone arrays for performing sound quality operations including noise suppression.

FIG. 2 illustrates an example of a system for performing sound quality operations. FIG. 2 illustrates a system 200 configured to perform sound quality operations such that sound or audio output to a user has good quality. The system 200 may be implemented by devices including computing devices, processors, or the like. FIG. 2 illustrates a separation engine 232 that is configured to at least process the background noise 202 and, in one example, separate noise and speech. In fact, embodiments of the invention can separate different types or categories of sound such as other voices, music, and the like. In one example, separating sound by category may allow different category specific suppression algorithms to be performed. For example, a machine learning model may learn to cancel other voices while another machine learning model may learn to cancel music or street noise.

Assuming that the desired audio is speech and all other audio is considered noise, by way of example only, embodiments of the invention operate to suppress the noise. Separating noise and speech allows the separation engine 232 to generate an anti-noise signal 212 that can reduce or cancel background noise 202 without impacting the user's speech and without impacting speech received from other users on the call (or, with respect to FIG. 1B, speech or desired audio (such as an online video or online music) that may be received from an online source). Thus, any background noise 202 that the user would otherwise hear is cancelled or reduced by the anti-noise signal 212, which may be played by the device speakers.

The microphone arrays illustrated in FIG. 1A can work together or independently. For example, the array 118 and the array 104 may both cooperate to enhance the audio signal transmitted over the network 100. Thus, the array 118 and the array 104 may, with respect to the speech of the user 102, perform functions to enhance the speech such as be removing noise, reverberation, echo, and the like. At the same time, the array 118 and 104 may also operate to suppress the noise 116 in the environment 114 such that the speech from the user 122, which was enhanced using the arrays 124 and/or 128 and which is output by the device 106, is easier for the user 102 to hear.

More specifically, the system 200 is configured to ensure that speech heard by a user has good quality. For a given user, embodiments of the invention may cancel the background noise in the given user's environment and output enhanced speech generated by remote users. Generating speech or audio for the given user may include processing signals that originate in different environments. As a result, the speech heard by the given user is enhanced.

In particular, the separation engine 232 is configured to perform sound source localization 206, sound source extraction 208, and noise suppression 210. The sound source localization 206 operates to determine where a sound originates. The sound source extraction 208 is configured to extract the noise from any speech that may be detected. The noise suppression 210 can cancel or suppress the noise without impacting the user's speech. For example, the sound source localization 206 may not cancel noise or speech that is sourced from the speakers of the user's device.

The separation engine 232 may include one or more machine learning models of different types. The machine learning model types may include one or more of classification, regression, generative modeling, DNN (Deep Neural Network), CNN (Convolutional Neural Network), FNN (Freeforward Neural Network), RNN (Recurrent Neural Network), reinforcement learning, or combination thereof. These models may be trained with datasets such as WaveNet denoising, SEGAN, EHNet, or the like.

In addition, data generated from actual calls or other usage such as in FIG. 1B can be recorded and used for machine model training. Also, the system 200 or the user 214 may provide feedbacks 230 to the separation engine 232. Objective feedback 230 may include evaluation metrics such as perceptual evaluation of speech quality, (PESQ), short-time objective intelligibility (STOI), frequency-weighted signal-noise ratio (SNR), or MOS. The user 214 may provide subjective feedback. For example, a user interface may allow the user 214 to specify the presence of echo, background noise, or other interference. In addition to standards and metrics, feedback may also include how the results relate to an average for a specific user or across multiple users.

The system 200 can compute the objective evaluation metrics, receive the subjective feedback, and compare the feedbacks with pre-set thresholds or requirements. Embodiments of the invention can be implemented without feedback or using one or more types of feedback. If the thresholds or requirements are not satisfied, optimizations are made until the requirements are satisfied.

The user settings and environment variables/features extracted at the time when the feedback is provided can be logged, along with the type of feedback the audio settings, quality, and/or enhancement process were associated with. This combination of settings and user feedback can be fed back into the model to help predict the optimal future settings. In some cases, user feedback can also be compared (anonymously) with other feedback from other users given similar audio environments and/or preferences. For example, (anonymous) feedback from a user who has a similar audio environment (e.g., similar amounts/types of background noise), and/or similar preference for how the audio sounds, and was satisfied with their settings, could help inform the correct settings and/or correction process for other users). To promote anonymity, federated learning or a similar approach could be used. Users could also be prompted to agree to sharing their anonymized data. Subsequent user feedback from the same user regarding whether there was an improvement or not can be helpful as well for updating the model.

During operation, the separation engine 232 may receive the noise signal from the intelligent microphone array 204. Features may be extracted from the noise signal. Example features include Mel-Frequency Cepstral Coefficients, Gammatone Frequency Cepstral Coefficient, Constant-Q spectrum, STFT magnitude spectrum. Logarithmic Power Spectrum, Amplitude, Harmonic Structure, and Onset (when a particular sound begins relative to others, etc.). Using these features, speech-noise separation is performed to extract a real time noise signal. This results in an anti-noise signal 212 or time-frequency mask that is added to the original background noise 202 signal to mask the noise for the user 214.

The system 200 may include an enhancement engine 234. In one embodiment, the enhancement engine 234 is configured to enhance the speech that is transmitted to other users. The input to the enhancement engine 234 may include a user's speech and background or environment noise. The enhancement engine 234 processes these inputs using machine learning models to enhance the speech. For example, the enhancement engine 234 may be configured to perform dereverberation 220 to remove reverberation, and echo cancellation 224. Beamforming 222 may be performed to focus on the user's speech signal. The speech is enhanced 226, in effect, by removing or suppressing these types of noise. The speech may be transmitted to the user 214 and output 228 from a speaker to the user 214.

Thus, the separation engine 232 uses the intelligent microphone array 204 and/or the device microphone array 218 to identify noise and generate anti-noise in real time in order to block the background noise from reaching the uses' ears. The enhancement engine 234 may use the intelligent microphone array 204 and the device microphone array 218 to perform machine learning based dereverberation, echo cancellation, speech enhancement and beamforming. These arrays, along with the arrays at other user environments, ensure that the speech heard by the users or participants of a call is high quality audio.

Returning to FIG. 1A, the ability to conduct calls that are satisfactory to all users includes the need to ensure that the communications have low latency. As latency increases, users become annoyed. By way of example only, latencies up to about 200 milliseconds are reasonably tolerated by users.

Latency is impacted by network conditions, compute requirements, and the code that is executed to perform the sound quality operations. Network latency is typically the largest. The introduction of machine learning models risks introducing excessive latencies in real-world deployments. As a result, embodiments of the invention may offload the workload. For example, the workload associated with the array 118 may be offloaded to a processing engine on the device 106 or on the servers 150, which may include edge servers. This allows latencies to be reduced or managed.

Figure 3:
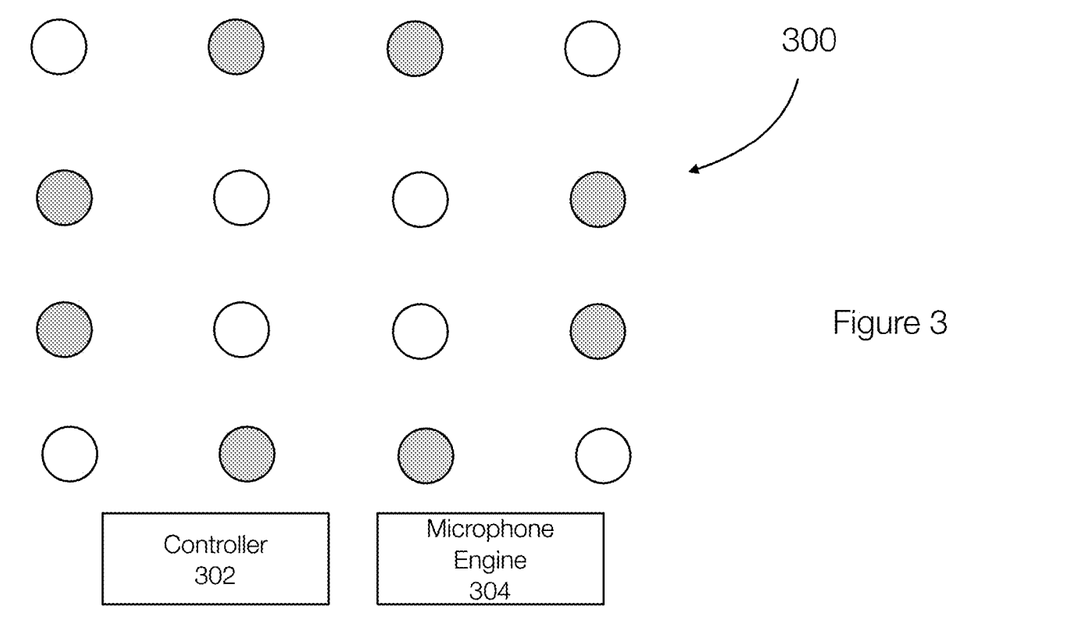
FIG. 3 discloses aspects of a microphone array with a circular microphone pattern.

FIG. 3 illustrates an example of microphone array. The array in FIG. 3 is an example of the array 118 in FIG. 1A. When deploying the array 118, embodiments of the invention may adaptively control which microphones are on and which are off. Thus, embodiments of the invention may operate using all of the microphones in an array or less than all of the microphones in the array.

Figure 4:
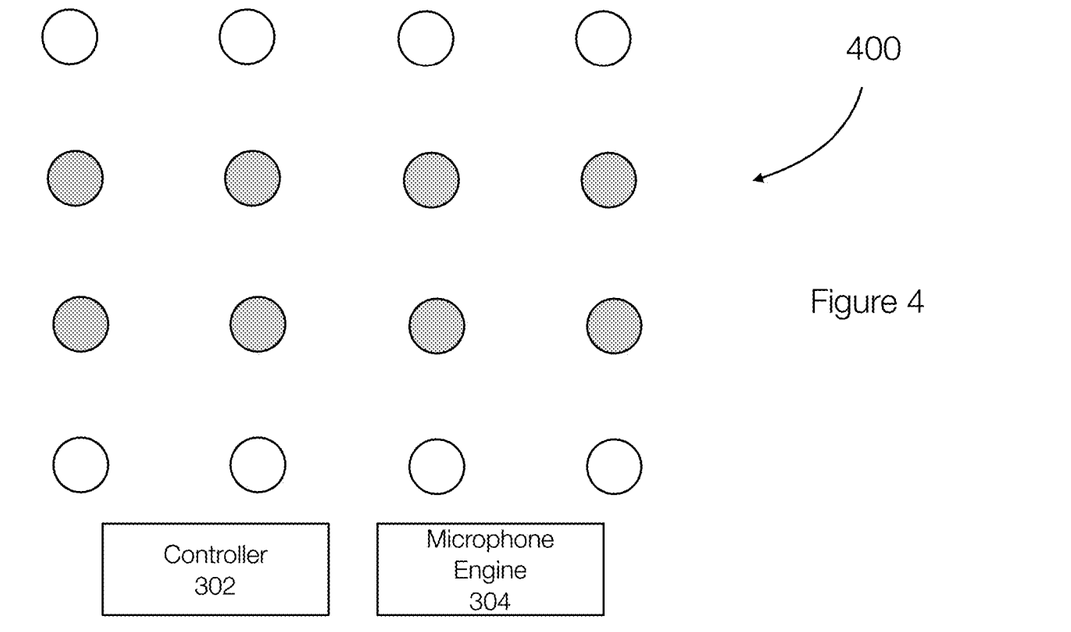
FIG. 4 discloses aspects of a microphone array with a rectangular microphone pattern.

FIG. 3 illustrates a specific pattern 300. In FIG. 3, the array is configured in a circular pattern 300. Thus, the grey microphones are turned on while the other microphones are turned off. FIG. 4 illustrates the array of FIG. 3 in another pattern. The pattern 400 shown in FIG. 4 is a rectangular pattern. The grey microphones are on while the others are off.

Depending on the size of the array, an array may be configured to include sufficient microphones to implement multiple patterns at the same time. In effect, a single array operates as multiple microphone arrays. This allows various sources of noises to be identified and processed by different array patterns in the microphone array. Alternatively, multiple arrays may be present in the environment and each array may be configured to process different noise categories or sources.

More generally, a microphone array is any number of microphones spaced apart from each other in a particular pattern. These microphones work together to produce an output signal or output signals. Each microphone is a sensor for receiving or sampling the spatial signal (e.g., the background noise). The outputs from each of the microphones can be processed based on spacing, patterns, number of microphones, types of microphones, and sound propagation principles. The arrays may be uniform (regular spacing) or irregular in form.

Embodiments of the invention may adaptively change the array pattern, use multiple patterns, or the like to perform sound quality operations. In one example, the array 118 and the array 104 may be controlled as a single array and may be adapted to perform sound quality operations.

The number and pattern/shape of the microphone array can be adaptively changed based on the noise sources detected. By continually assessing the spectral, temporal, level, and/or angular input characteristics of the user's communication environment, appropriate steering of features such as directions, shapes, and number of microphones can be performed to optimize noise suppression.

Embodiments of the invention may include pre-stored patterns that are effective for specific noise sources. For example, a two-microphone array pattern may be sufficient when only low-frequency background noise is detected and identified. If multiple voices are detected, a ring-shaped microphone array (e.g., using 8 microphones) may be formed based on the loudness, distance, and learned behaviors. If transient noise is detected, another pattern may be formed to automatically mask the transient noise. In a noisy background with many noise sources, the array may be separated into groups such that different noise sources can be cancelled simultaneously.

In one example, the microphone array may be associated with a controller 302 and/or a processing engine 304, which may be integrated or the same, that continually evaluate needs. The controller 302 can thus turn microphones on/off, wake/sleep microphones, or the like. The processing engine 304 may be implemented in a more powerful compute environment, such as the user's device or in the cloud. This allows the operations of the separation engine 232 and/or the enhancement engine 234 to be performed in a manner that reduces communication latencies while still providing a quality audio signal.

The ability to suppress noise often depends on the number of noise sources, the number of microphones and their arrangements, the noise level, the way source noise signals are mixed in the environment, prior information about the sources, microphones, and mixing parameters. These allow the system to continually learn and optimize.

Embodiments of the invention thus reduce background noise with improved speech. The user experience in a noisy environment is improved. Further, the speech is improved in an adaptive manner in real time using adaptive array configurations.

The array is configured to continuously detect the location and type of noise sources. This information is used to automatically switch between different modes, select an appropriate number of microphones, select an appropriate microphone pattern, or the like. Embodiments of the invention include machine learning models that can be improved with objective and subjective feedback. Further, processing loads can be offloaded to reduce the computational workload at the microphone arrays.

Figure 5:
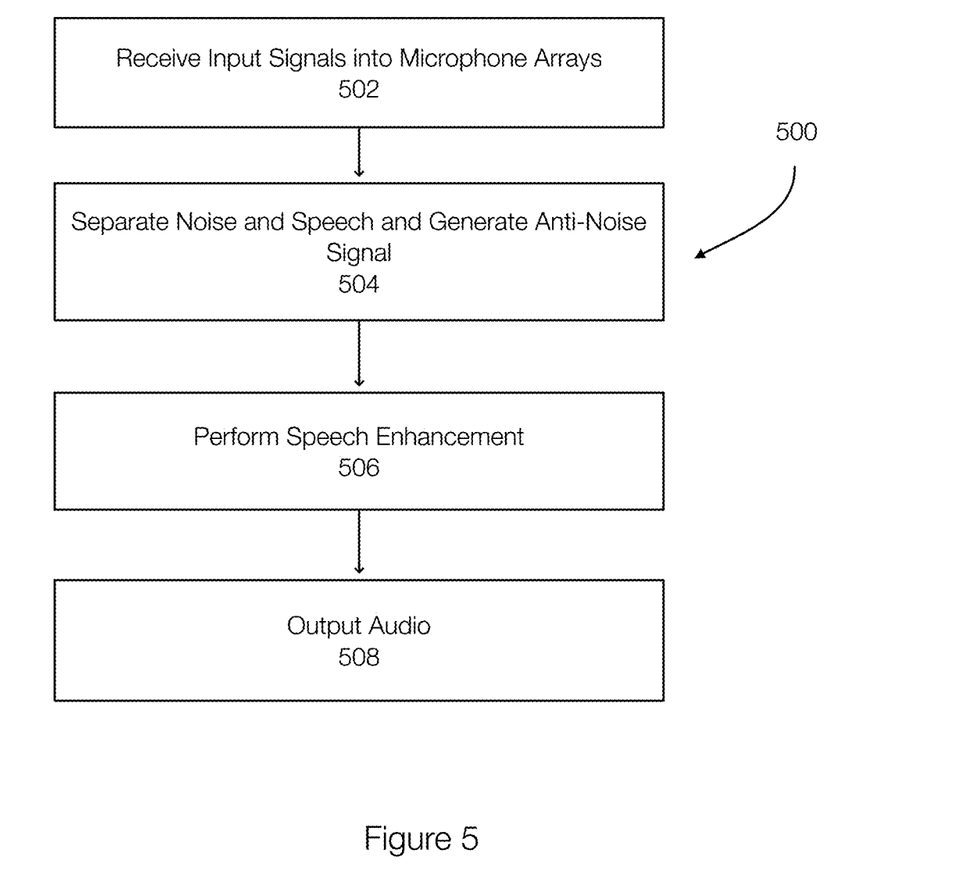
FIG. 5 discloses aspects of sound quality operations.

FIG. 5 discloses aspects of methods for sound quality operations. A sound quality operation or method 500 allows the speech heard by a user to be more easily understood compared to a situation where embodiments of the invention are not performed.

Initially, audio (e.g., noise, speech) is received 502 as input into one or more microphone arrays. The arrays may be located in different environments (e.g., associated with different users). As previously stated, each of the users or participants in a call may be associated with one or more microphone arrays including a device microphone array and an intelligent microphone array. Each of the microphone arrays in each of the environments thus receives noise signals. Further, the noise signals are not typically the same in different environments.

Next, the input audio (signals received at the microphone arrays) is processed. For example, speech and noise in the audio signal may be separated 504 by a separation engine. This may include performing sound source localization, sound source extraction, and noise suppression. This may also include generating an anti-noise signal to cancel or suppress the noise that has been separated from the speech. This typically occurs at the environment in which speech is heard.

Speech enhancement is also performed 506. Speech enhancement may occur in different environments. For example, the speech of a first user that is transmitted to other users may be enhanced prior to or during transmission of the speech to other users by the enhancement engine.

Next, audio is output 508. At a user's device, the anti-noise signal and the enhanced speech received from other users are mixed and are output. This signal cancels or suppresses the noise in the user's environment and allows the user to hear the enhanced speech.

Embodiments of the invention relate to using or controlling microphone arrays and/or sound processing to optimize audio based on a user's subjective feedback. When a user provides feedback, an orchestration engine receives the feedback from the user and generates output to control the microphone array settings. After adjustment, if performance metrics are below thresholds interpreted from the outputs by the user or if the user continues to provide similar feedback, the orchestration engine continues to perform optimizations. The optimizations may include changes in the learning performed by the orchestration engine.

Figure 6A:
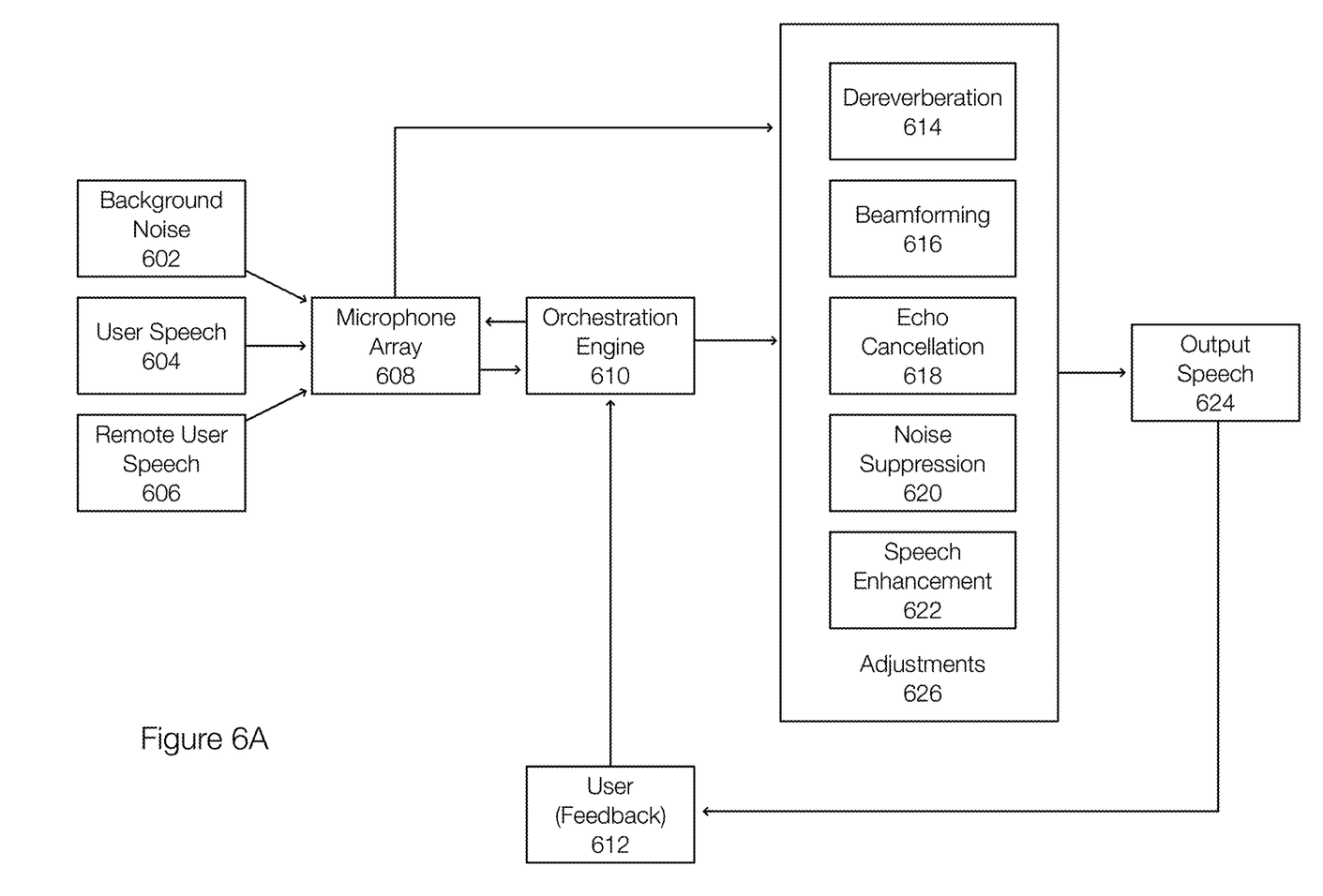
FIG. 6A discloses aspects of providing feedback when performing sound quality operations including noise suppression.

FIG. 6A discloses aspects of a single user environment for performing optimizations based on user feedback. FIG. 6A illustrates a microphone array 608 (may be representative of multiple microphone arrays) that receives input that may include, by way of example and not limitation, background noise 602, user speech 604 and remote user speech 606. The remote user speech 606 may be picked up by the remote user's microphone array and may also be picked up by the receiving user's microphone array once emitted by the receiving user's speakers.

In this example, output speech 624 (or other desired signal) is output by a user device or by its speakers. As previously described for a conference call, the microphone arrays operating with respect to a conference call can be configured such that the output speech or the remote user is heard. More specifically, the sound signal output by the user's device may be configured to cancel the background noise, reduce echo and reverberations, while enhancing the remote user's speech.

Figure 7A:
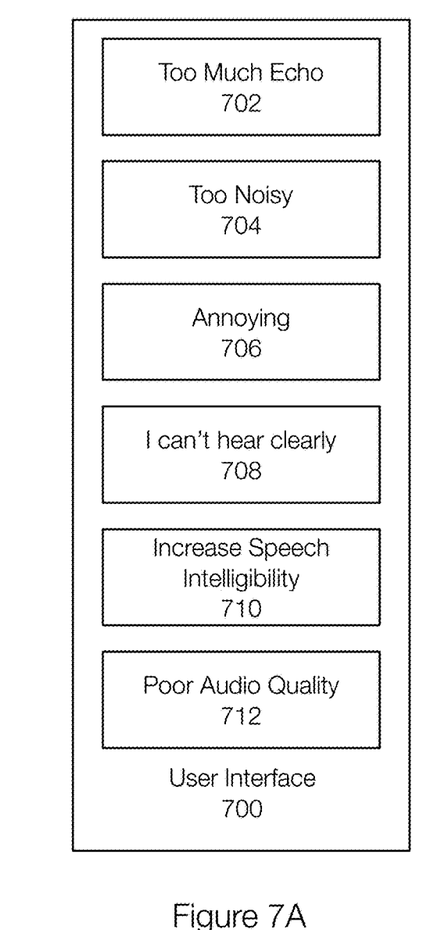
FIG. 7A discloses aspects of a user interface.

In one example, the user may be presented with a user interface that includes buttons or other input mechanisms that allow a user to provide input. FIG. 7A illustrates a user interface 700 that allows a user to provide feedback such as too much echo 702, too noisy 704, annoying 706, I can't hear clearly 708, increase speech intelligibility 710, and poor audio quality 712. By selecting or clicking on one of the buttons on the user interface 700, an orchestration engine may change settings on the microphone arrays (local and/or remote) to improve the sound quality. Selecting too much echo 702, for example, may be used to cancel echo by reconfiguring the microphone array or by processing the output of the microphone array differently. More specifically, the input selected by a user may be provided to a machine learning model, such as an orchestration engine. The machine learning model may output a microphone array configuration that is then implemented in the user's microphone array. Each button in the user interface 200 may correspond to specific characteristics of the sound sources in the user's environment and may be associated with specific microphone settings.

Figure 7B:
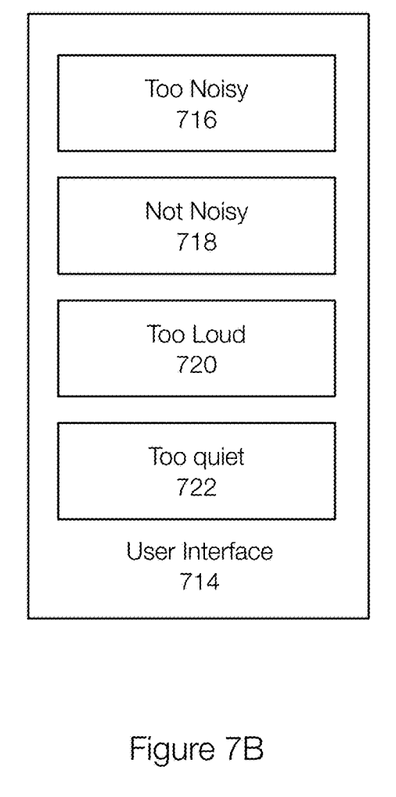
FIG. 7B discloses aspects of another user interface.
Figure 7C:
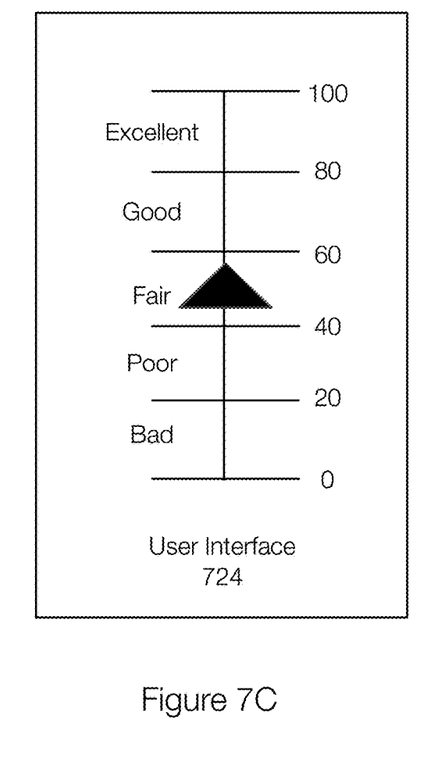
FIG. 7C discloses aspects of another user interface.

FIG. 7B illustrates another user interface 714 that allows a user to provide feedback such as too noisy 716, not noisy 718 too loud 720 and too quiet 722. The user interface 714 allows a user to provide feedback related to aspects of the sound in the environment. FIG. 7C illustrates a user interface 724 that allows a user to provide a rating of the audio quality. The user interface 724 may be adapted to includes a slider input for multiple characteristics (e.g., each of the characteristics in the user interface 700).

FIGS. 7A-7C illustrate examples of user interfaces. However, other user interfaces may be used such as a star rating, or the like. In addition, different inputs may be used. Further, the user interfaces can be tied to a sound map such that any feedback provided by the user can be applied to specific sound sources. The inputs may include both unsatisfactory feedback and satisfactory input.

Returning to FIG. 6A, the user feedback 612 is provided to the orchestration engine 610. The user feedback 612 is based on the output speech 624 (or other desired output). The orchestration engine 610 may use the input from the microphone array (or from features extracted from the output of the microphone array) to make adjustments 626. In one example, the orchestration engine 610 includes a machine learning model that generates an output based on the user input. The output is at least one of the adjustments 626, which adjustments 626 can be applied to the microphone array 626. Thus, the orchestration engine 610 may generate adjustments 626 that are intended to optimize dereverberation 614, beamforming 616, echo cancellation 618, nose suppression 620 and speech enhancement 622. The changes to the microphone array may include changing which microphones are on/off, changing an array pattern, steering the microphone array differently, or the like or combination thereof. The changes recommended by the orchestration engine 610 may also include changes to the output signal that includes the output speech 624.

Figure 6B:
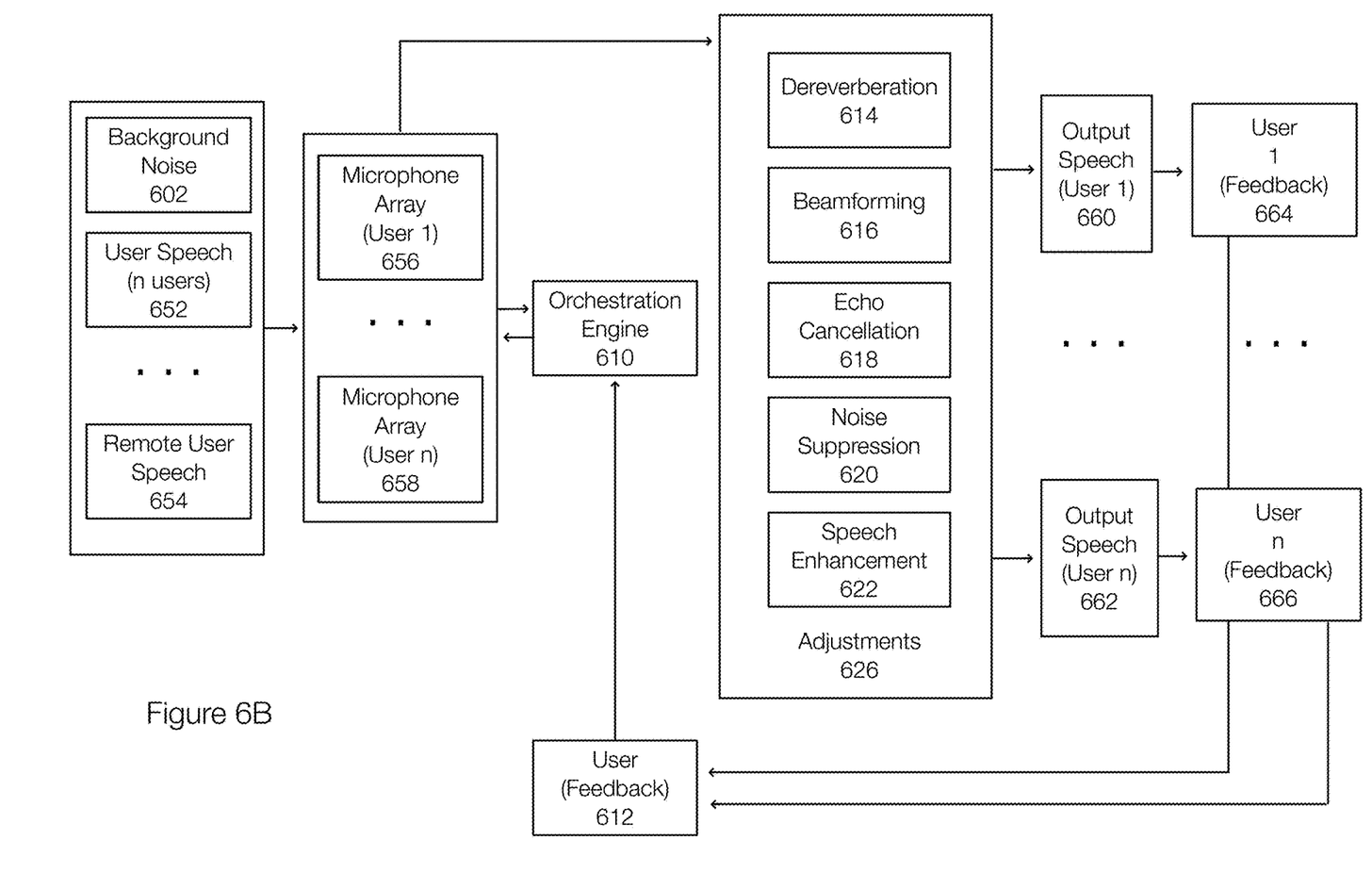
FIG. 6B discloses aspects of providing feedback when performing sound quality operations, including noise suppression, for multiple users.

FIG. 6B discloses aspects of group user control. In FIG. 6B, the orchestration engine 610 receives input from n microphone arrays, illustrated as microphone array 656 (user 1) and microphone array 658 (user n). For example, n users may be present in the same room and each of the user's devices includes one of the microphone arrays.

As a result, all of the sound in the room, including background noise 602, the speech 652 of n users, the speech of remote users 644 output by the other devices in the environment are received into the microphone arrays. For example, the microphone array 656 receives a mix of background noise, speech from remote participants output at the other devices, her own speech, other users' speech, and the like.

In one example, all of the microphone arrays within the same room can communicate with each other as well as with the orchestration engine 610.

Each of the users can provide user feedback 612 as previously described via a user interface. The orchestration engine 610 receives feedback 612 from all of the users and determines the best settings for each user. When multiple users provide feedback, the feedbacks are fused, in one example, for decision making purposes performed by the orchestration engine 610.

Each of the devices receives commands from the orchestration engine 610 and adjusts settings accordingly. Thus, the microphone array of each device (e.g., each laptop in a room of laptops) or the output signal is adjusted based on the overall feedback from all users.

For example, the microphones arrays within the same room may be connected as a distributed microphone array. This allows the distributed microphone array to provide better audio for each user. Background noise or interfering voices can be masked for each user. The speech output from each laptop is optimized for the corresponding user. Audio for each user can be improved without requiring the users to wear headsets. Thus the microphone array on each device (e.g., each laptop) can be controlled to provide noise suppression, dereverberation, echo cancellation, speech enhancement, and beamforming features to get speech from a remote participant with good intelligibility and play to each of the users.

After adjustment, if the performance metrics are still below a threshold or if the users continue to provide feedback requesting further improvement, the orchestrator 610 may continue to make adjustments 626, such as adjustments to optimize reverberation 614, beamforming 616, echo cancellation 618, noise suppression 620, speech enhancement 622, or the like. The speech output to the respective users (output speech 660 to 662) is optimized for each user and each user can provide feedback (feedback 664 to 666), which is provided collectively to the orchestration engine 610 as the feedback 612.

The n (or more if present) microphone arrays 656, 658 can be used to perform noise/speech separation and sound source localization. This allows the microphone arrays (or the engine that processes the output of the microphone arrays) to locate the speech from each user, the noise in the environment, reverberation echo, and the like.

When operating, each user may benefit from noise cancellation, reverberation reduction, echo cancellation, and the like and benefit from enhanced speech of remote users. For example, from the perspective of user 660, the speech of the user 662 is cancelled. The speaker associated with the user 660 may output a signal configured to cancel the speech of the user 660 as well as other noise. Similarly, all of the sound sources in an environment that may impact the ability of the user 660 to hear speech of a remote participant, may be cancelled.

Once the sound sources in the environment are localized, the speakers can be configured to improve speech intelligibility.

More specifically, feedback from the users may include parameters or metrics such as noisy, loudness, clarity, annoyance, specific types of frequently heard sounds (motors, sirens), comfort level, or the like. The feedback can be provided in different ways including by voice or gesture commands, pre-designed buttons, moving bars on scales, entering ratings, inputting text, or the like or combination thereof.

Once feedback is provided and adjustments have been made, follow up feedback allows the system to determine whether the adjustments made the audio quality better or worse. If worse, follow up optimizations are performed until positive feedback is received and/or the user stops providing feedback and/or until the improvements or optimizations meet a previously accepted quality for the user or a group of users.

The orchestration engine 610 is an example of a machine learning model that has been trained on appropriate data (e.g., historical data collected from similar situations). The input to the orchestration engine 610 may include one or more of (or features derived therefrom) user feedback, user's preferences, parameters of each microphone array, location of each sound/noise source, room acoustic parameters, or the like or combination thereof.

Figure 8:
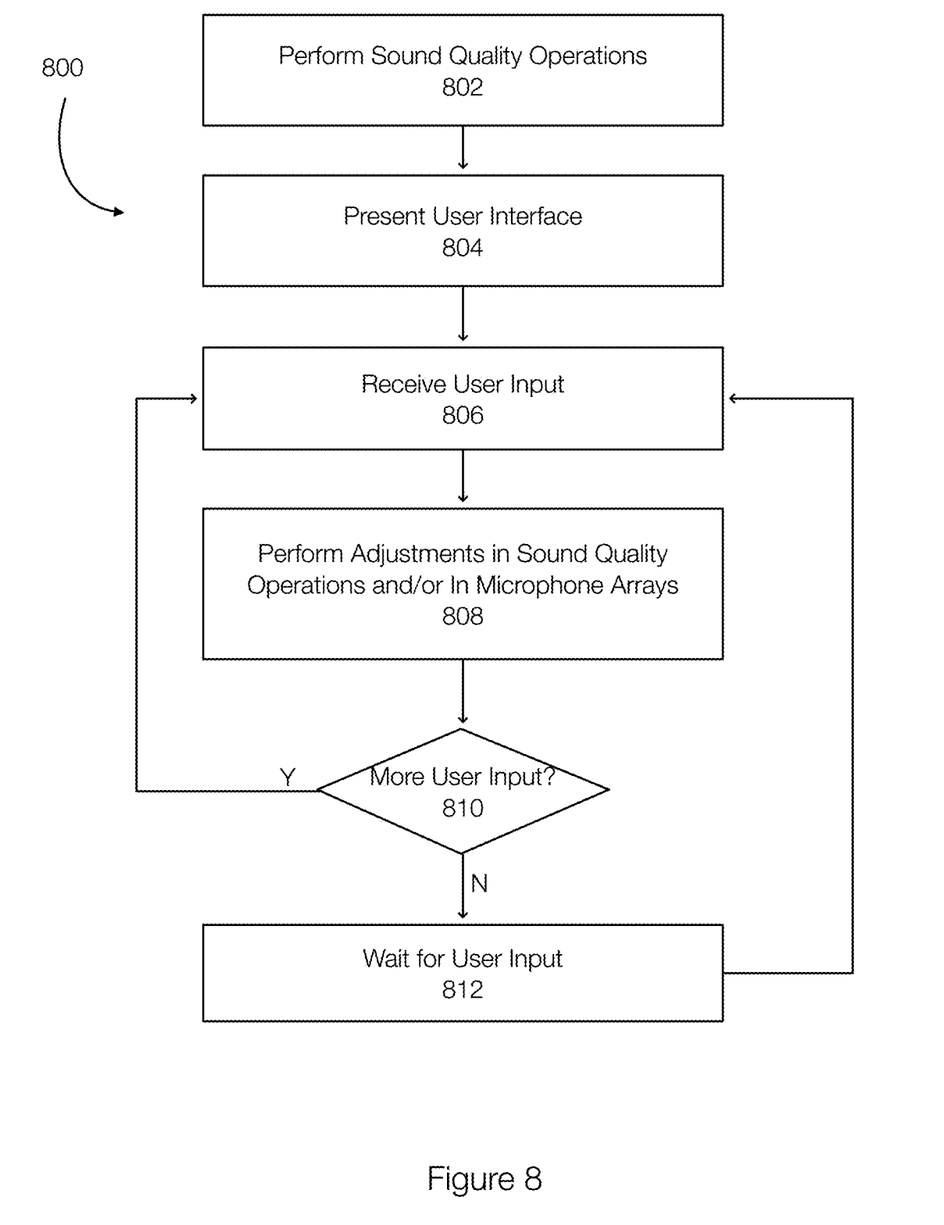
FIG. 8 discloses aspects of a method for providing feedback in the context of sound quality operations including noise suppression.

FIG. 8 discloses aspects of a method for performing sound quality operations. Generally, sound operations are performed 802. In the context of conference calls, the sound operations are configured to enhance the sound or speech of remote users presented to the user over the device's speakers and are configured to emit a signal configured to cancel noise in the user's environments. In the context of watching a movie or consuming other online content that includes an audio content, the sound operations are configured to improve the audio intelligibility by at least performing noise suppression to suppress noise, cancel echo, reduce reverberation, and the like in the user's environment.

As these sound quality operations are performed, a user interface may be presented 804 to the user (or to the users when multiple users are present in the same environment). User input is received 806. Other input such as preference models, microphone array parameters, sound/noise source locations, room acoustic parameters, loudness for each sound/noise source, and the like may also be received.

These inputs may be provided to an orchestration engine that generates an output for each relevant device. The output includes adjustments 808 to be made to the sound quality operations and/or the microphone arrays. If the environment is too noisy, the adjustments are configured to further cancel the noise. If the feedback is too quiet, the speech of the remote user may be further clarified or increased in volume. Alternatively, the cancellation may be reduced.

More generally, the output of the orchestration engine may be to change microphone array settings. This may improve beamforming, may further isolate certain noise sources, or the like. The output of the orchestration engine may also be a signal included in an output signal intended for the user. The output signal may include components configured to cancel noise in the user's environment.

If more input is received (Y at 810), optimizations continue. If no input is received (N at 810), the system may simply wait for more input. At the same time data may be collected for machine learning model training and validation purposes.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect (s) or solution(s). Finally, it is not required that any embodiment implement any of the advantageous and unexpected effects disclosed herein.

In general, embodiments of the invention may be implemented in connection with systems, devices, software, and components, that individually and/or collectively implement, and/or cause the implementation of, sound quality operations. More generally, the scope of the invention embraces any operating environment in which the disclosed concepts may be useful.

Example cloud computing environments, which may or may not be public, include storage environments that may provide data protection functionality for one or more clients. Another example of a cloud computing environment is one in which processing, data protection, and other, services may be performed on behalf of one or more clients or engines. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

Embodiments of the invention may comprise physical machines, virtual machines (VM), containers, or the like.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method comprising: receiving user input via a user interface presented on a device associated with the user into an orchestration engine, generating an output, by the orchestration, in response to the user input, wherein the output includes adjustments configured to optimize sound quality of sound heard by the user and output by the device, and adjusting at least a microphone array associated with the device with the adjustments.

Embodiment 2. The method of embodiment 1, further comprising receiving additional user inputs and generating additional outputs that include additional adjustments.

Embodiment 3. The method of embodiment 1 and/or 2, further comprising adjusting the microphone array based on the additional adjustments.

Embodiment 4. The method of embodiment 1, 2, and/or 3, further comprising receiving second user input from a second user via a second user interface on a second device.

Embodiment 5. The method of embodiment 1, 2, 3, and/or 4, wherein the adjustments include first adjustments for the microphone array and second adjustments for a second microphone array associated with the second device.

Embodiment 6. The method of embodiment 1, 2, 3, 4, and/or 5, further comprising making additional adjustments when metrics associated with a sound quality are below a threshold as measured by receiving more user inputs.

Embodiment 7. The method of embodiment 1, 2, 3, 4, 5, and/or 6, wherein the first and second microphone arrays form a distributed microphone array and are located in the same environment.

Embodiment 8. The method of embodiment 1, 2, 3, 4, 5, 6, and/or 7, further comprising generating adjustments to multiple microphone arrays based on inputs from multiple users, wherein the adjustments are distinct for each of the multiple users.

Embodiment 9. The method of embodiment 1, 2, 3, 4, 5, 6, 7, and/or 8, wherein the user input received via the user interface includes subjective input including one or more of a noise satisfaction input, a loudness satisfaction input, a clarity satisfaction input, a comfort level satisfaction input, or combination thereof.

Embodiment 10. The method of embodiment 1, 2, 3, 4, 5, 6, 7, 8, and/or 9, wherein the orchestration engine comprises a machine learning model configured to receive input from at least one microphone array and generate output to control the at least one microphone array.

Embodiment 11. A method for performing any of the operations, methods, or processes, or any portion of any of these, or any combination of these, disclosed herein.

Embodiment 12. A non-transitory storage medium having stored therein instructions that are executable by one or more hardware processors to perform operations comprising the operations of any one or more of embodiments 1 through 11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' or 'engine' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   receiving user input via a user interface presented on a device associated with the user into an orchestration engine;
   generating an output, by the orchestration engine, in response to the user input, wherein the output includes adjustments configured to optimize sound quality of sound heard by the user and output by the device; and
   adjusting at least a microphone array associated with the device with the adjustments.

2. The method of claim 1, further comprising receiving additional user inputs and generating additional outputs that include additional adjustments.

3. The method of claim 2, further comprising adjusting the microphone array based on the additional adjustments.

4. The method of claim 1, further comprising receiving second user input from a second user via a second user interface on a second device.

5. The method of claim 4, wherein the adjustments include first adjustments for the microphone array and second adjustments for a second microphone array associated with the second device.

6. The method of claim 1, further comprising making additional adjustments when metrics associated with a sound quality are below a threshold as measured by receiving more user inputs.

7. The method of claim 5, wherein the first and second microphone arrays form a distributed microphone array and are located in the same environment.

8. The method of claim 1, further comprising generating adjustments to multiple microphone arrays based on inputs from multiple users, wherein the adjustments are distinct for each of the multiple users.

9. The method of claim 1, wherein the user input received via the user interface includes subjective input including one or more of a noise satisfaction input, a loudness satisfaction input, a clarity satisfaction input, a comfort level satisfaction input, or combination thereof.

10. The method of claim 1, wherein the orchestration engine comprises a machine learning model configured to receive input from at least one microphone array and generate output to control the at least one microphone array.

11. A non-transitory storage medium having stored therein instructions that are executable by one or more hardware processors to perform operations comprising:
    receiving user input via a user interface presented on a device associated with the user into an orchestration engine;
    generating an output, by the orchestration engine, in response to the user input, wherein the output includes adjustments configured to optimize sound quality of sound heard by the user and output by the device; and
    adjusting at least a microphone array associated with the device with the adjustments.

12. The non-transitory storage medium of claim 11, further comprising receiving additional user inputs and generating additional outputs that include additional adjustments.

13. The non-transitory storage medium of claim 12, further comprising adjusting the microphone array based on the additional adjustments.

14. The non-transitory storage medium of claim 11, further comprising receiving second user input from a second user via a second user interface on a second device.

15. The non-transitory storage medium of claim 14, wherein the adjustments include first adjustments for the microphone array and second adjustments for a second microphone array associated with the second device.

16. The non-transitory storage medium of claim 11, further comprising making additional adjustments when metrics associated with a sound quality are below a threshold as measured by receiving more user inputs.

17. The non-transitory storage medium of claim 15, wherein the first and second microphone arrays form a distributed microphone array and are located in the same environment.

18. The non-transitory storage medium of claim 11, further comprising generating adjustments to multiple microphone arrays based on inputs from multiple users, wherein the adjustments are distinct for each of the multiple users.

19. The non-transitory storage medium of claim 11, wherein the user input received via the user interface includes subjective input including one or more of a noise satisfaction input, a loudness satisfaction input, a clarity satisfaction input, a comfort level satisfaction input, or combination thereof.

20. The non-transitory storage medium of claim 11, wherein the orchestration engine comprises a machine learning model configured to receive input from at least one microphone array and generate output to control the at least one microphone array.

* * * * *